US009825512B2

(12) United States Patent
Shijo et al.

(10) Patent No.: US 9,825,512 B2
(45) Date of Patent: Nov. 21, 2017

(54) LAMINATED CORE MANUFACTURING METHOD

(75) Inventors: Daisuke Shijo, Tokyo (JP); Hiroyuki Akita, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 406 days.

(21) Appl. No.: 14/127,842

(22) PCT Filed: Oct. 6, 2011

(86) PCT No.: PCT/JP2011/073071
§ 371 (c)(1),
(2), (4) Date: Dec. 19, 2013

(87) PCT Pub. No.: WO2013/051125
PCT Pub. Date: Apr. 11, 2013

(65) Prior Publication Data
US 2014/0139068 A1 May 22, 2014

(51) Int. Cl.
*H01F 7/06* (2006.01)
*H02K 15/02* (2006.01)
*H02K 1/14* (2006.01)

(52) U.S. Cl.
CPC ........... *H02K 15/022* (2013.01); *H02K 1/148* (2013.01); *Y10T 29/49009* (2015.01)

(58) Field of Classification Search
CPC . H02K 1/148; H02K 15/022; Y10T 29/49009
(Continued)

(56) References Cited

U.S. PATENT DOCUMENTS 5,095,610 A 3/1992 Schultz et al.
5,986,377 A * 11/1999 Yamada ................. H02K 1/148
310/216.013

(Continued)

FOREIGN PATENT DOCUMENTS

CN 1241831 A 1/2000
CN 1387294 A 12/2002
(Continued)

OTHER PUBLICATIONS

Japanese Office Action dated Mar. 17, 2015 issued in corresponding Japanese Patent Appln. No. 2013-537327, with English translation (8 pages).
(Continued)

*Primary Examiner* — Paul D Kim
(74) *Attorney, Agent, or Firm* — Buchanan Ingersoll & Rooney PC

(57) ABSTRACT

A laminated core manufacturing method is linearly arranging and punching out a plurality of separate core pieces formed of a back yoke portion and a magnetic-pole teeth portion protruding from the back yoke portion and die-cut caulking. The manufacturing method includes: a first step of punching out a first region located on an opposite side to the magnetic-pole teeth portion between adjacent ends of the back yoke portions of the core pieces; a second step of punching out a second region located on a side of the magnetic-pole teeth portion between the adjacent ends of the back yoke portions of the core pieces; a third step of punching out a region that brings the first region punched out in the first step and the second region punched out in the second step into communication; and a fourth step of forming the magnetic-pole teeth portion by punching.

17 Claims, 7 Drawing Sheets

(58) Field of Classification Search
USPC .................. 29/417, 592.1, 602.1, 604–606
See application file for complete search history.

(56) References Cited

U.S. PATENT DOCUMENTS

| | | | |
|---|---|---|---|
| 6,369,687 B1 | 4/2002 | Akita et al. | |
| 6,646,535 B2 | 11/2003 | Miyake et al. | |
| 6,658,721 B2 * | 12/2003 | Kazama | H02K 1/12 29/596 |
| 7,576,467 B2 * | 8/2009 | Yamamoto | H02K 3/325 310/215 |
| 8,205,320 B2 * | 6/2012 | Akita | H02K 1/148 29/596 |
| 8,456,055 B2 * | 6/2013 | Kinoshita | H02K 1/148 310/216.008 |
| 8,786,158 B2 * | 7/2014 | Neuenschwander | H02K 15/022 310/216.043 |
| 8,833,112 B2 * | 9/2014 | Ahn | D06F 37/304 310/216.043 |
| 9,099,897 B2 * | 8/2015 | Neuenschwander | B23P 11/005 |
| 9,136,735 B2 * | 9/2015 | Hashimoto | H02K 1/148 |
| 2002/0075121 A1 | 6/2002 | Akita et al. | |
| 2002/0130750 A1 | 9/2002 | Miyake et al. | |

FOREIGN PATENT DOCUMENTS

| | | |
|---|---|---|
| JP | H09-051640 A | 2/1997 |
| JP | 2000-116074 A | 4/2000 |
| JP | 2000-201458 A | 7/2000 |
| JP | 2002-171725 A | 6/2002 |
| JP | 2002-272027 A | 9/2002 |
| JP | 2002-281697 A | 9/2002 |
| JP | 2004-242482 A | 8/2004 |
| JP | 2005-110464 A | 4/2005 |
| JP | 2008-109785 A | 5/2008 |
| JP | 2009-077598 A | 4/2009 |
| JP | 2009-077600 A | 4/2009 |
| JP | 2009-131027 A | 6/2009 |
| JP | 2011-087374 A | 4/2011 |
| JP | 2011-114876 A | 6/2011 |
| KR | 20020061184 A | 7/2002 |
| KR | 20020074078 A | 9/2002 |

OTHER PUBLICATIONS

Office Action issued by the Taiwanese Patent Office dated Dec. 11, 2013, in corresponding Taiwanese Patent Application No. 100141774 and an English translation of the Official Action. (12 pages).

International Search Report (PCT/ISA/210) dated Jan. 10, 2012, by the Japanese Patent Office as the International Searching Authority for International Application No. PCT/JP2011/073071.

Partial translation of Office Action (Notice of Preliminary Rejection) dated Jun. 16, 2015, by the Korean Patent Office in corresponding Korean Patent Application No. 10-2014-7001519. (14 pages).

Notification of Reasons for Refusal dated Mar. 6, 2016, issued by the Japanese Patent Office in corresponding Japanese Patent Application No. 2015-109459, and English Translation of the Office Action (8 pages).

Office Action (First Office Action) dated Aug. 26, 2015, issued by the State Intellectual Property Office of the People's Republic of China in corresponding Chinese Patent Application No. 201180072459.7, and English Translation of the Office Action (13 pages).

Second Office Action dated Apr. 25, 2016, issued by the Chinese Patent Office in corresponding Chinese Patent Application No. 201180072459.7, and English Translation of the Office Action (6 pages)

Office Action dated Apr. 12, 2017, by the German Patent Office in Corresponding German Patent Application No. 11 2011 105 466.7 and English translation of the Office Action. (13 pages).

Office Action (Reasons) dated Aug. 26, 2014, by the Japanese Patent Office in corresponding Japanese Patent Application No. 2013-537327, and an English Translation of the Office Action. (9 pages).

Office Action dated Jun. 8, 2017, by the Chinese Patent Office in corresponding Chinese Patent Application No. 201180072459.7 and English translation of the Office Action. (10 pages).

* cited by examiner

LAMINATED CORE MANUFACTURING METHOD

TECHNICAL FIELD

The present invention relates to a manufacturing method of a laminated core in a rotary electric machine, and more particularly, to a laminated core manufacturing method that not only improves productivity of a laminated core formed by connecting core pieces and enhances a yield ratio of material, but also enhances characteristics of the laminated core.

BACKGROUND ART

As the related art, JP-A-2000-116074 discloses an example of a laminated core that includes: a first core member formed by sequentially arranging core pieces, each of which has a back yoke portion, a magnetic-pole teeth portion protruding from the back yoke portion, an arc-shaped convex portion provided to one end of the back yoke portion, an arc-shaped concave portion provided to the other end of the back yoke portion, and a rotation shaft portion provided to the arc-shaped convex portion, in such a manner that the arc-shaped convex portion and the arc-shaped concave portion of adjacent core pieces fit and abut against each other; and a second core member formed by sequentially arranging the core pieces in a direction opposite to the arrangement direction of the first core member in such a manner that the arc-shaped convex portion and the arc-shaped concave portion fit and abut against each other, and the first core members and the second core members are stacked alternately and connected to each other. The laminated cores formed by stacking core pieces are connected to each other in a rotatable manner about the rotation shaft portions.

The fit-abutting portions of the arc-shaped convex portion and the arc-shaped concave portion of the adjacent core pieces are formed by punching and lancing inside a die as is disclosed in JP-A-2002-171725.

CITATION LIST

Patent Literature

PTL 1: JP-A-2000-116074
PTL 2: JP-A-2002-171725

SUMMARY OF INVENTION

Technical Problem

With the laminated core in the related art described above, the fit-abutting portions of the adjacent core pieces are formed by lancing. Hence, strain occurs in a region corresponding to a bending supporting point of the lancing. Accordingly, there arises a problem that efficiency of a rotary electric machine is decreased and torque pulsations are increased due to deterioration of shape accuracy of the laminated core and partial magnetic strain of the laminated core.

Also, FIG. 1 of PTL 1 discloses a method of enhancing a yield ratio of material of the laminated core by applying pressing by arranging the core pieces linearly. It is, however, difficult to accurately manufacture a punch that punches out clearances by which to form the ends of the back yoke portions of adjacent core pieces and inner and outer peripheral portions of the back yoke portions in the vicinity together in a single step as in Step A or Step B of PTL 1. Moreover, such a punch is of a shape such that spots punching out the clearances and the inner and outer peripheral portions are connected in a discontinuous manner. Hence, stress is concentrated in the connected portion and durability of the punch is deteriorated. It thus becomes difficult to mass-produce laminated cores using the die.

The invention was devised to solve the problems discussed above and has an object to provide a pressing method achieving excellent mass-productivity and a high yield ratio of material and a laminate core manufacturing method by which characteristics, such as efficiency and torque pulsations, can be enhanced by reducing processing-induced strain of core pieces.

Solution to Problem

A laminated core manufacturing method of the invention is a manufacturing method of a laminated core by linearly arranging and punching out a plurality of separate core pieces each formed of a back yoke portion and a magnetic-pole teeth portion protruding from the back yoke portion followed by stacking and die-cut caulking. The manufacturing method includes: a first step of punching out a first region located on an opposite side to the magnetic-pole teeth portion between adjacent ends of the back yoke portions of the core pieces; a second step of punching out a second region located on a side of the magnetic-pole teeth portion between the adjacent ends of the back yoke portions of the core pieces; a third step of punching out a region that brings the first region punched out in the first step and the second region punched out in the second step into communication; and a fourth step of forming the magnetic-pole teeth portion by punching.

Advantageous Effects of Invention

According to the laminated core manufacturing method of the invention, the region that brings the first region punched out in the first step and the second region punched out in the second step into communication is punched out in the third step. Owing to this configuration, pressing can be applied in a state in which the core pieces are arranged linearly without the need to use a lancing technique. It thus becomes possible to enhance characteristics, such as efficiency and torque pulsations, by reducing processing-induced strain.

The step of punching out the adjacent ends of the back yoke portions is divided to: the first step of punching out the first region located on an opposite side to the magnetic-pole teeth portion between the adjacent ends of the back yoke portions of the core pieces; the second step of punching out the second region located on a side of the magnetic-pole teeth portion between the adjacent ends of the back yoke portions of the core pieces; and the third step of punching out the region that brings the first region punched out in the first step and the second region punched out in the second step into communication. Hence, not only can punches be manufactured easily, but also the durability of the punches can be enhanced, which can consequently enhance mass-productivity.

Further, pressing can be applied in a state in which the core pieces are arranged linearly in a metal sheet. Hence, a yield ratio of material can be enhanced.

DESCRIPTION OF EMBODIMENTS

First Embodiment

Figure 1:
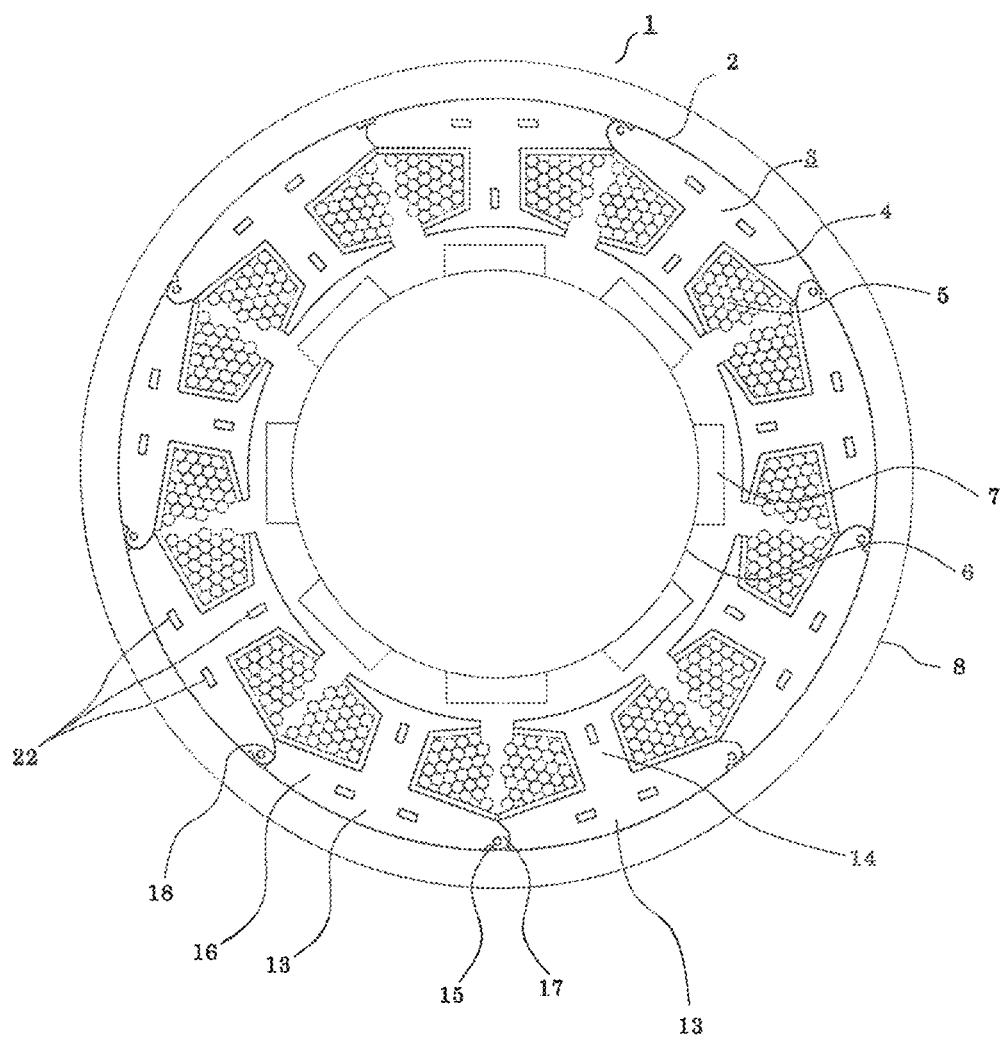
FIG. 1 is a plan view showing a rotary electric machine according a first embodiment of the invention.
Figure 2:
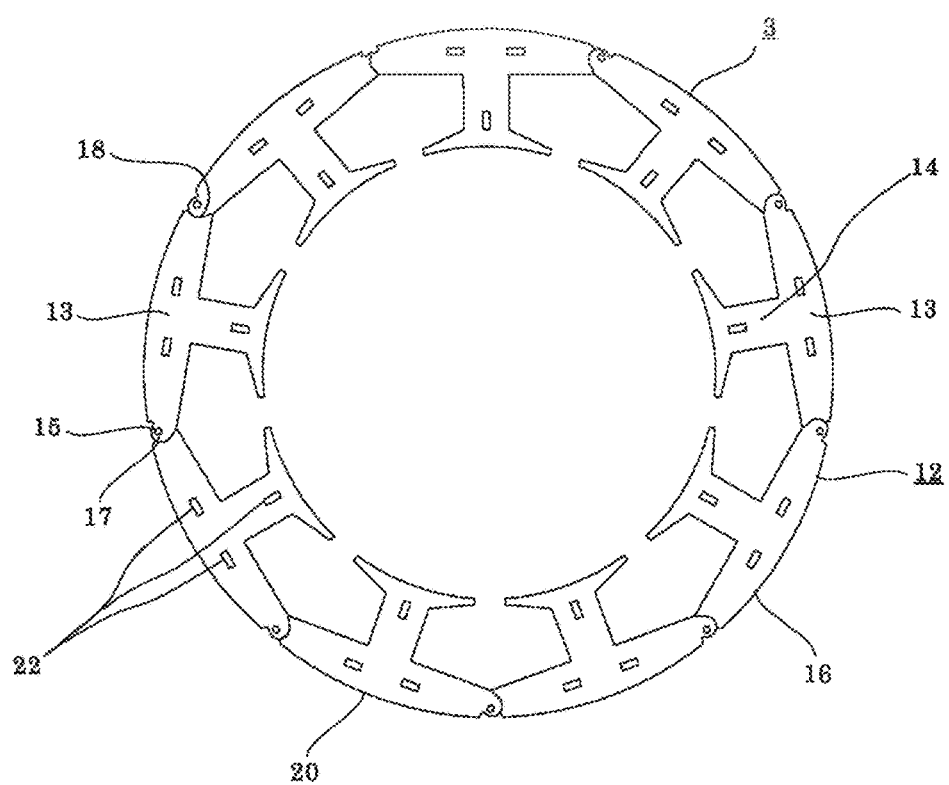
FIG. 2 is a plan view showing a laminated core according to the first embodiment of the invention.
Figure 3:
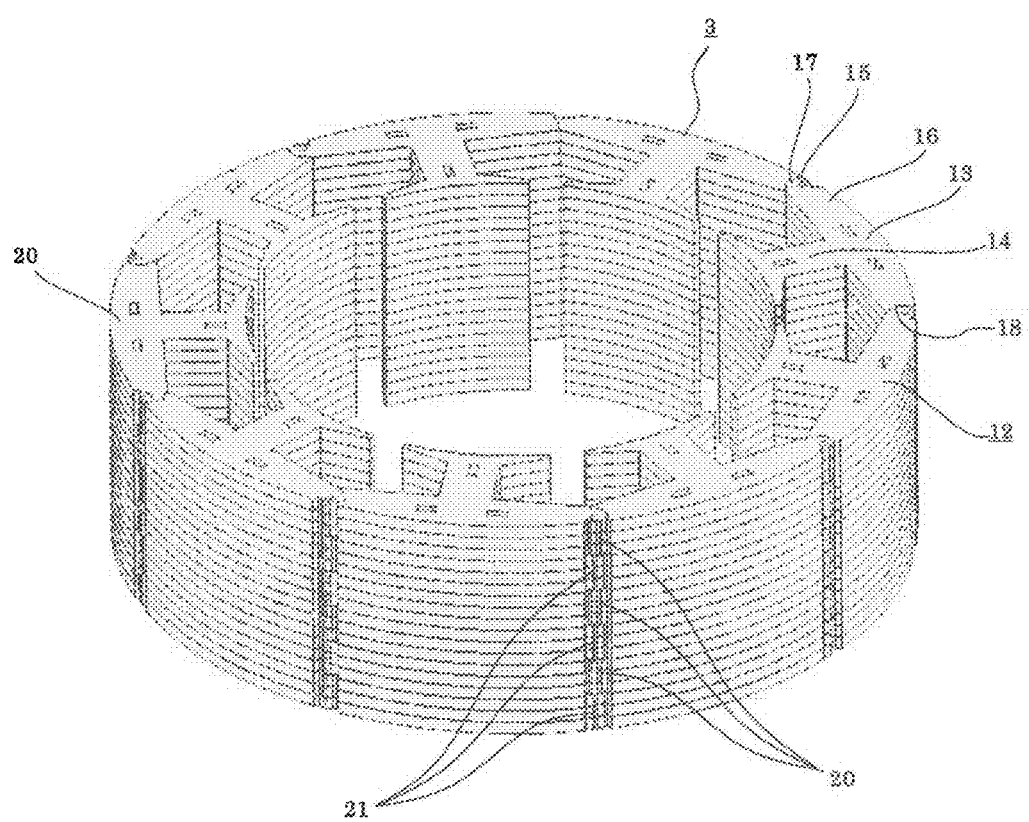
FIG. 3 is a perspective view showing the laminated core according to the first embodiment of the invention.
Figure 4:
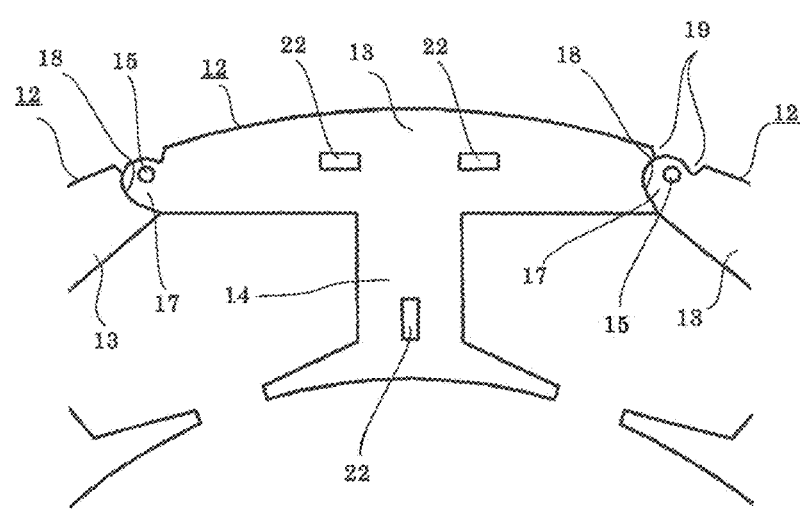
FIG. 4 is a partial enlarged view of FIG. 2 according to the first embodiment of the invention.
Figure 5:
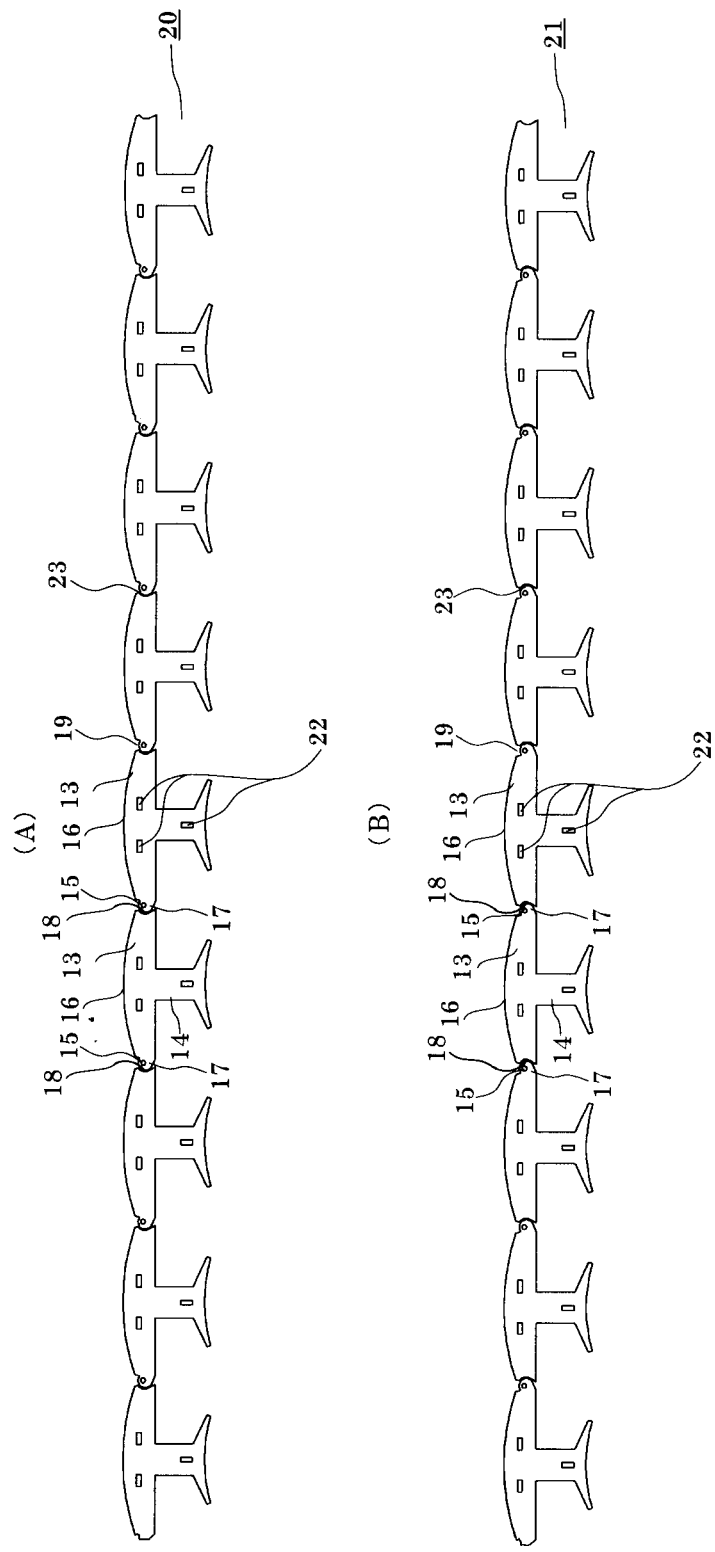
FIG. 5 is a plan view showing a state after pressing of the laminated core according to the first embodiment of the invention.
Figure 6:
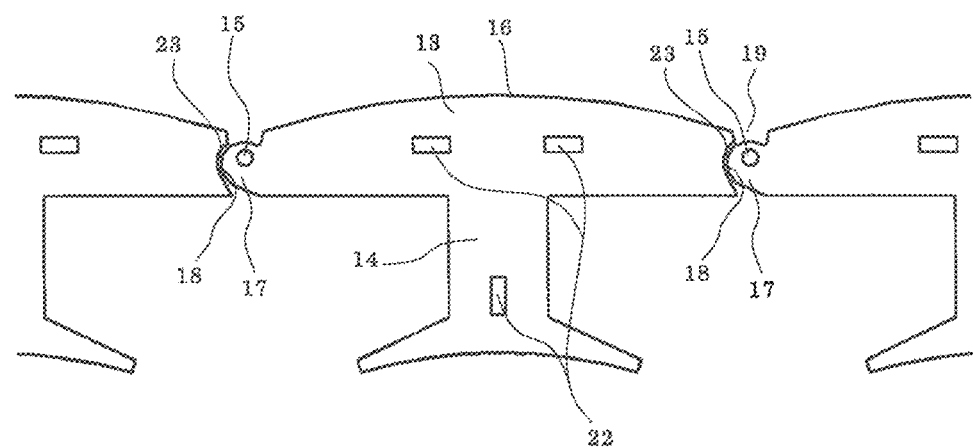
FIG. 6 is a partial enlarged view of FIG. 5 according to the first embodiment of the invention.
Figure 7:
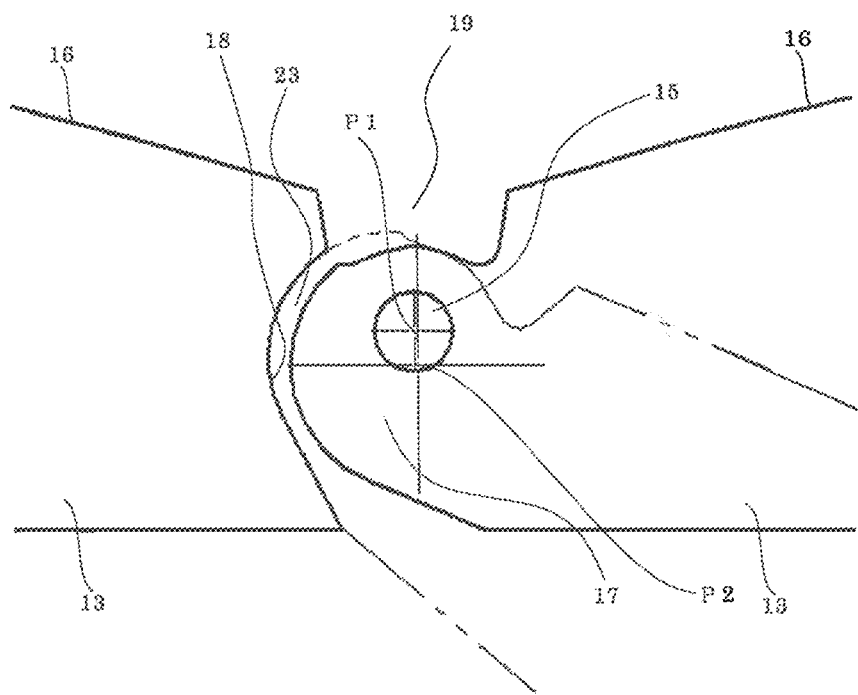
FIG. 7 is a partial enlarged view of FIG. 6 according to the first embodiment of the invention.
Figure 8:
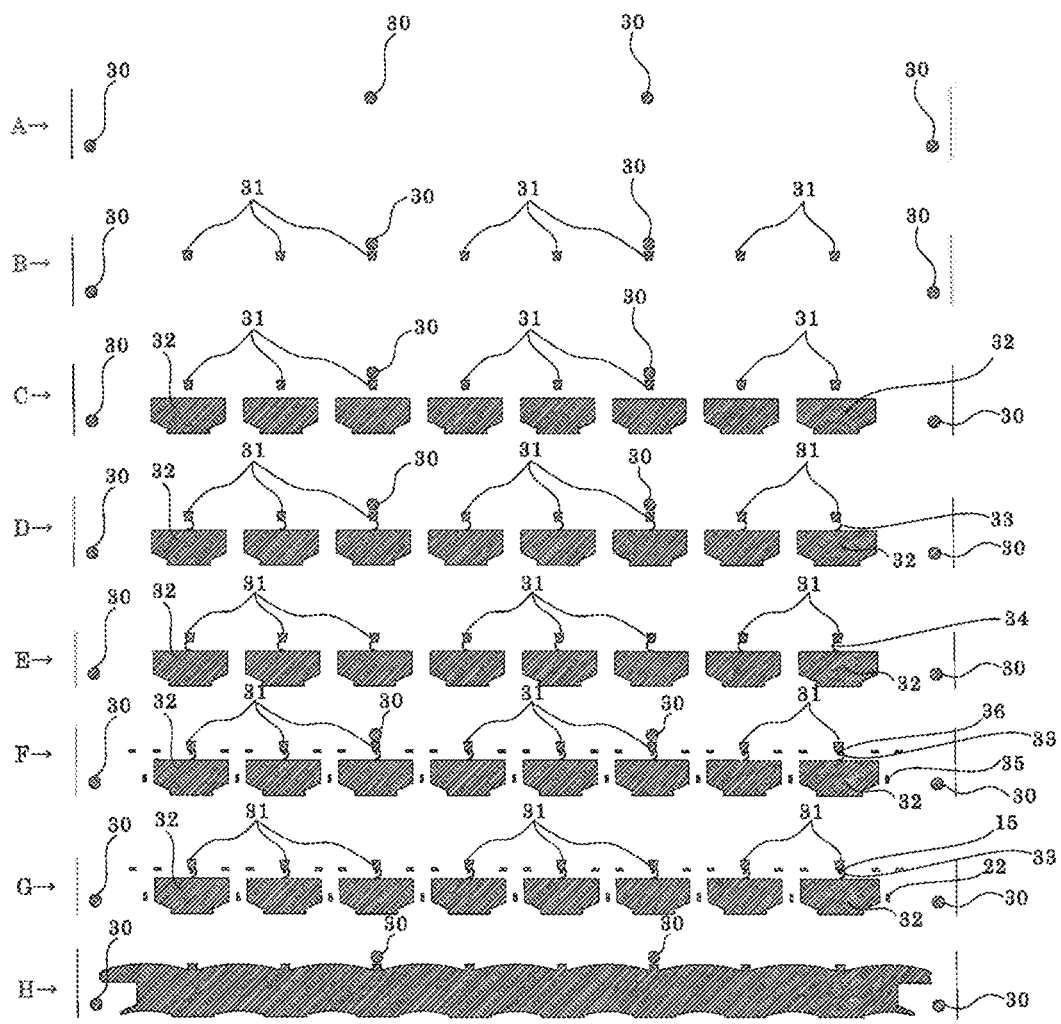
FIG. 8 is a plan view showing a pressing process chart of the laminated core according to the first embodiment of the invention.

Hereinafter, a first embodiment of the invention will be described according to FIG. 1 through FIG. 7. Descriptions will be given by labeling same or equivalent members and portions with same reference numerals in the respective drawings. FIG. 1 is a plan view showing a rotary electric machine according to the first embodiment of the invention. FIG. 2 is a plan view showing a laminated core according to the first embodiment of the invention. FIG. 3 is a perspective view showing the laminated core according to the first embodiment of the invention. FIG. 4 is a partial enlarged view of FIG. 2 according to the first embodiment of the invention. FIG. 5 is a plan view showing a state after pressing of the laminated core according to the first embodiment of the invention. FIG. 6 is a partial enlarged view of FIG. 5 according to the first embodiment of the invention. FIG. 7 is a partial enlarged view of FIG. 6 according to the first embodiment of the invention. FIG. 8 is a plan view showing a pressing process chart of the laminated core according to the first embodiment of the invention.

Referring to the respective drawings, numeral 1 denotes a rotary electrical machine that includes a stator 2 formed by winding a drive coil 5 around a laminated core 3 via an insulator 4, a rotor 6 having permanent magnets 7 installed on the inner peripheral side of the stator 2, and a housing 8 holding the stator 2 and the rotor 6.

As is shown in FIG. 2, the laminated core 3 is formed, for example, of nine core blocks 12. As is shown in FIG. 4, the core block 12 is formed of a back yoke portion 13 forming an annular yoke portion of the laminated core 3, a magnetic-pole teeth portion 14 protruding to the inner peripheral side from the back yoke portion 13 and wound around by the drive coil 5, a rotation shaft portion 15 provided to one end of the back yoke portion 13 to which an adjacent core block 12 is connected, and an outer peripheral side notch portion 19. The adjacent core blocks 12 are connected in a rotatable manner with respect to each other about the rotation shaft portion 15.

As is shown in FIG. 5, the laminated core 3 is manufactured by pressing a magnetic steel sheet in a state in which the laminated core 3 is developed linearly so that the respective magnetic-pole teeth portions 14 are substantially parallel to one another. A first core member 20 is formed of core pieces 16, as is shown in FIG. 6, each of which has a substantially convex portion 17 at one end of the back yoke portion 13, a substantially concave portion 18 at the other end, and outer peripheral side notch portions 19 provided on the outer peripheral side of the substantially convex portion 17 and the substantially concave portion 18, and which are sequentially arranged in such a manner that the substantially convex portions 17 and the substantially concave portions 18 oppose each other at regular pitches as is shown in FIG. 5A, and as is shown in FIG. 5B, a second core member 21 is formed of the core pieces 16 which are arranged in such a manner that the substantially convex portions 17 and the substantially concave portions 18 oppose each other at regular pitches in a direction opposite to the direction of the substantially convex portions 17 and the substantially concave portions 18 of the first core member 20. For example, as is shown in FIG. 3, the first core members 20 and the second core members 21 are stacked alternately every three layers and fixed by die-cut caulkings 22.

The rotation shaft portion 15 is provided to the substantially convex portion 17 of the core piece 16. The outer peripheral side notch portion 19 is of a symmetrical shape with respect to a straight line passing the rotation shaft portion 15 and parallel to the magnetic-pole teeth 14. Hence, because the first core member 20 and the second core member 21 are magnetically balanced, not only can torque pulsations be reduced, but also a punch that forms the outer peripheral side notch portion 19 in a pressing step of the laminated core described below can be limited to one type. It thus becomes possible to make a die simpler and more compact.

As are shown in FIG. 2 and FIG. 4, the core pieces 16 are formed in such a manner that the substantially convex portion 17 and the substantially concave portion 18 abut against each other when the laminated core 3 is closed in an arc shape by rotating the core pieces 16 about the rotation shaft portions 15. Herein, as is shown in FIG. 7, a shaft center P1 of the rotation shaft portion 15 is provided to be located more on the outer peripheral side than a center P2 of the arc portion of the substantially convex portion 17. Hence as are shown in FIG. 5 and FIG. 6, in a state in which the laminated core 3 is developed linearly so that the respective magnetic-pole teeth portions 19 are parallel to one another, a core piece-to-core piece clearance 23 continuing from the outer peripheral side notch portion 19 to the inner peripheral side is formed between the substantially convex portion 17 and the substantially concave portion 18 of the adjacent core pieces 16.

Also, as is indicated by a chain double-dashed line of FIG. 7, when the core pieces 16 are closed to form the annular laminated core 3, the substantially concave portion 18 and the substantially convex portion 17 abut against each other. Hence, magnetic resistance of the back yoke portion 13 can be reduced. It thus becomes possible to suppress a loss in efficiency of the rotary electric machine 1.

The pressing process chart in the manufacturing of the laminated core 3 will now be described using Steps A through H of FIG. 8. Firstly in Step A, pilot holes 30 for the positioning with respect to the die are punched out of a strip-shaped magnetic steel plate set in a pressing machine. Subsequently, the magnetic steel plate is moved in a material feed direction at regular pitches and processing operations in the respective steps are performed in series.

Step B is a first step of punching out a first region located on the opposite side to the magnetic-pole teeth portion between the adjacent ends of the back yoke portions 13 of the core pieces 16. Herein, slits 31 from which to form the outer peripheral side notch portions 19, which are the first region, are punched out.

Step C is a second step of punching out a second region located on the side of the magnetic-pole teeth portion between the adjacent ends of the back yoke portions 13 of the core pieces 16. The drawing shows an example in which a fourth step of forming the magnetic-pole teeth portions 14 by punching is performed together with the second step in a single step, so that slits 32 from which to form the second region and the magnetic-pole teeth portions 14 are punched out.

Steps D and E are a third step of punching out a region that brings the first region punched out in the first step and the second region punched out in the second step into communication. Herein, slits 33 and 34, which are core piece-to-core piece clearance 23 and by which to form the substantially convex portion 17 and the substantially concave portion 18 at the ends of the back yoke portion 13 of the core piece 16, are punched out.

The punches that punch out these slits 33 and 34 are automatically switched in synchronization with operations of the pressing machine in order to form two types of members: the first core member 20 and the second core member 21 shown in FIG. 5A and FIG. 5B, respectively, so that the slits 33 and 34 are not punched out with an overlap. For example, the slits 33 and the slits 34 are automatically switched and punched out every predetermined number of stacked layers of the laminated core 3, for example, every three plates.

Herein, because the slits 31, 32, 33, and 34 are punched out using individual punches, the respective punches can be manufactured easily. Also, the slits 33 and 34 are punched out after the slits 31 and 32 are punched out beforehand. It thus becomes possible to lessen a load applied to the punches used for the slits 33 and 34 and having relatively low rigidity.

In order to further enhance the durability of the punches used for the slits 33 and 34, it is preferable to set a width of the punches for the slits 33 and 34, which corresponds to the core piece-to-core piece clearance 23, to be equal to or greater than a plate thickness of the core piece 16 (magnetic steel plate).

As described above, the slits 31 from which to form the outer peripheral side notch portions 19 are of a symmetrical shape with respect to a straight line passing the rotation shaft portion 15 and parallel to the magnetic-pole teeth 14, that is, a symmetrical shape with respect to the slits 33 and 34. It thus becomes possible to form the outer peripheral side notch portions 19 using one type of punch and this process can be combined into Step B above. Hence, the die can be simpler and more compact.

In subsequent Step F, slits 35 in which to fit the die-cut caulkings 22 and holes 36 in which to fit the rotation shaft portions 15 are punched out. In Step G, dowels for the die-cut caulkings 22 and the rotation shaft portions 15 are molded. Step F and Step G are selectively switched. For example, in Step F, the slits 35 and the holes 36 are automatically switched and punched out every predetermined number of stacked layers of the laminated core 3, for example, every three plates. Layers are stacked in such a manner that the die-cut caulkings 22 fit into the slits 35 and the rotation shaft portions 15 fit into the holes 36.

Also, because the first core member 20 and the second core member 21 are magnetically balanced, torque pulsations can be reduced. Finally in Step H, the outer periphery of the core pieces 16 are punched out and the core pieces 16 are stacked inside the die in series. Herein, Step F formed by the automatically switched punch becomes effective when the predetermined number of stacked layers of the laminated core 3 have been processed. It thus becomes possible to prevent a plurality of laminated cores 3 from being connected by die-cut caulking.

The above has described Step F and Step G in a case where the subject is the first core member 20 when Step D is selected. Although it is not shown in the drawing, after the same Step F and Step G are performed by selecting Step E, the outer periphery of the core pieces 16 is punched out in Step H and the core pieces 16 are stacked inside the die in series.

According to the laminated core in a rotary electric machine according to one embodiment of the invention, when the substantially convex portions 17 and the substantially concave portions 18 are provided at the ends of the back yoke portions 13 of the adjacent core pieces 16, the process is divided to: the first step of punching out the first region located on the opposite side to the magnetic-pole teeth portions between the adjacent ends of the back yoke portions 13; the second step of punching out the second region located on the side of the magnetic-pole teeth portions between the adjacent ends of the back yoke portions 13; and the third step of punching out a region that brings the first region punched out in the first step and the second region punched out in the second step into communication. Hence, not only can the punches be manufactured easily, but also the durability of the punches can be enhanced. It thus becomes possible to enhance mass-productivity by pressing in a state in which the core pieces 16 are arranged linearly.

Also, the laminated core manufactured in the first embodiment can suppress processing-induced strain. Hence, not only can characteristics, such as efficiency and torque pulsations, be enhanced, but also a yield ratio of material can be enhanced. Further, influences of magnetic anisotropy of the magnetic steel plate can be reduced in comparison with a case where the pressing is applied in a state in which the laminated cores are closed in an arc shape or an annular shape. Hence, torque pulsations can be reduced.

The above has described a case where the second step of punching out the second region located on the side of the magnetic-pole teeth portion between the adjacent ends of the back yoke portions 13 of the core pieces 16 and the fourth step of forming the magnetic-pole teeth portions 14 by punching are performed together in a single step. It should be appreciated, however, that the invention is not limited to this case. It goes without saying that the second step of punching out the second region can be performed separately from the punching step of forming the magnetic-pole teeth 14. Further, the punching step of forming the magnetic-pole teeth 14 and Step H of punching out the outer periphery of the core pieces 16 may be performed together in a single step, in which case the die can be more compact by reducing the number of steps.

Incidentally, the embodiment above has described a case where the process is divided to: the first step of punching out the first region located on the opposite side to the magnetic-pole teeth portion between the adjacent ends of the back yoke portions 13; the second step of punching out the second region located on the side of the magnetic-pole teeth portion between the adjacent ends of the back yoke portions 13; and the third step of punching out a region that brings the first region punched out in the first step and the second region punched out in the second step into communication. However, the first step of punching out the first region and the third step of punching out the region that brings the first region and the second region into communication may be common, that is, may be performed at the same time. In comparison with the case in the related art described above, not only can the punches be manufactured more easily, but also the durability of the punches can be enhanced. It thus becomes possible to enhance mass-productivity by pressing in a state in which the core pieces 16 are arranged linearly.

Also, the embodiment above has described a case where the process is divided to: the first step of punching out the first region located on the opposite side to the magnetic-pole teeth portion between the adjacent ends of the back yoke portions 13; the second step of punching out the second region located on the side of the magnetic-pole teeth portion between the adjacent ends of the back yoke portions 13; and the third step of punching out a region that brings the first region punched out in the first step and the second region punched out in the second step into communication. However, the second step of punching out the second region and the third step of punching out the region that brings the first region and the second region into communication may be common, that is, may be performed at the same time. In comparison with the case in the related art described above, not only can the punches be manufactured more easily, but also the durability of the punches can be enhanced. It thus becomes possible to enhance mass-productivity by pressing in a state in which the core pieces 16 are arranged linearly.

In the embodiment described above, the outer peripheral side notch portions 19 are formed in Step B. However, by combining this step with Step H of punching out the outer periphery of the core pieces 16, it becomes possible to make the die more compact by reducing the number of steps.

The embodiment described above is the manufacturing method of the laminated core formed by connecting the adjacent core blocks 12 using the rotation shaft portions 15. It should be appreciated, however, that by omitting the processing of the rotation shaft portions 15, it becomes possible to apply this manufacturing method to a manufacturing method of a laminated core in which the core blocks 12 are separated from one another. In this case, there can be achieved an advantage that not only can a yield ratio of material of a separate-type laminated core be enhanced, but also productivity can be enhanced.

It should be understood that the embodiment of the invention can be modified or omitted as the need arises within the scope of the invention.

INDUSTRIAL APPLICABILITY

The invention is suitable to realize a laminated core manufacturing method by which characteristics, such as efficiency and torque pulsations, can be enhanced by reducing processing-induced strain of the core pieces.

The invention claimed is:

1. A laminated core manufacturing method of manufacturing a laminated core by linearly arranging and punching out a plurality of separate core pieces each formed of a back yoke portion and a magnetic-pole teeth portion protruding from the back yoke portion followed by stacking and die-cut caulking, the manufacturing method comprising:
    a first step of punching out a first region located on an opposite side to the magnetic-pole teeth portion between adjacent ends of the back yoke portions of the core pieces;
    a second step of punching out a second region located on a side of the magnetic-pole teeth portion between the adjacent ends of the back yoke portions of the core pieces, the second region having a shape of an area defined by edges of adjacent magnetic-pole teeth portions, to form the magnetic-pole teeth portion; and
    a third step of punching out a third region and a fourth region that bring the first region punched out in the first step and the second region punched out in the second step into communication, the third region and the fourth region being curved regions that curve in opposite directions from each other.

2. The laminated core manufacturing method according to claim 1, wherein:
    the adjacent ends of the back yoke portions of the plurality of core pieces are provided with substantially convex portions at one ends and substantially concave portions at the other ends, which are formed in such a manner that the substantially convex portions at one ends of the core pieces and the substantially concave portions at the other ends of the core pieces abut against each other.

3. The laminated core manufacturing method according to claim 2, wherein:
    the laminated core is manufactured by alternately stacking a first core member formed by sequentially arranging the core pieces provided with the back yoke portions having the substantially convex portions at one ends and the substantially concave portions at the other ends, and a second core member formed by sequentially arranging the core pieces provided with the back yoke portions having the substantially concave portions at positions corresponding to positions at which the core pieces of the first core member have the substantially convex portions and the substantially convex portions at positions corresponding to positions at which the core pieces of the first core member have the substantially concave portions.

4. The laminated core manufacturing method according to claim 3, wherein:
    the substantially convex portions are provided with connection means for connecting edge portions of the respective core pieces that lie adjacent to each other in a stacking direction.

5. The laminated core manufacturing method according to claim 4, wherein:
    a shape of the first region punched out in the first step is symmetrical with respect to a straight line parallel to a protruding direction of the magnetic-pole teeth portion and passing a rotation center of the connection means.

6. The laminated core manufacturing method according to claim 4, wherein:
    a rotation center of the connection means is provided so as to be located on a more outer peripheral side than a rotation center of the substantially convex portions.

7. The laminated core manufacturing method according to claim 3, wherein:
    in the step of punching out the third region and the fourth region that bring the first region and the second region into communication, a punching width is at least equal to a plate thickness of the core pieces.

8. The laminated core manufacturing method according to claim 2, wherein:
    the substantially convex portions are provided with connection means for connecting edge portions of the respective core pieces that lie adjacent to each other in a stacking direction.

9. The laminated core manufacturing method according to claim 8, wherein:
    a shape of the first region punched out in the first step is symmetrical with respect to a straight line parallel to a protruding direction of the magnetic-pole teeth portion and passing a rotation center of the connection means.

10. The laminated core manufacturing method according to claim 8, wherein:
   a rotation center of the connection means is provided so as to be located on a more outer peripheral side than a rotation center of the substantially convex portions.

11. The laminated core manufacturing method according to claim 2, wherein:
   in the step of punching out the third region and the fourth region that bring the first region and the second region into communication, a punching width is at least equal to a plate thickness of the core pieces.

12. The laminated core manufacturing method according to claim 2, wherein:
   a shape of the back yoke portions is such that no step is produced on an outer peripheral side where the ends of the back yoke portions abut against each other in a state in which a plurality of the core pieces are sequentially arranged in an annular shape or an arc shape.

13. The laminated core manufacturing method according to claim 1, wherein:
   in the step of punching out the third region and the fourth region that bring the first region and the second region into communication, a punching width is at least equal to a plate thickness of the core pieces.

14. The laminated core manufacturing method according to claim 1, wherein:
   the first step of punching out the first region is performed with the third step of punching out the third region and the fourth region that bring the first region and the second region into communication.

15. The laminated core manufacturing method according to claim 1, wherein:
   the second step of punching out the second region is performed with a punch that punches out the third region and the fourth region that bring the first region and the second region into communication.

16. The laminated core manufacturing method according to claim 1, wherein:
   the first step of punching out the first region is performed with a step of punching out and stacking the core pieces.

17. The laminated core manufacturing method according to claim 1, wherein
   the first region is an outer peripheral side notch portion;
   the third region and the fourth region form a convex portion and a concave portion at the adjacent ends of the back yoke portions of the core pieces; and
   the method includes a fourth step of forming a rotation shaft portion in the convex portion, wherein the outer peripheral side notch portion is of a symmetrical shape with respect to a straight line that passes the rotation shaft portion and that is parallel to the magnetic-pole teeth.

* * * * *